United States Patent
Zhang et al.

(10) Patent No.: US 7,557,055 B2
(45) Date of Patent: *Jul. 7, 2009

(54) TUNABLE LOW LOSS MATERIAL COMPOSITION

(75) Inventors: Xubai Zhang, Ellicott City, MD (US); Louise C. Sengupta, Ellicott City, MD (US); Elijah Underhill, Columbia, MD (US)

(73) Assignee: Paratek Microwave, Inc., Nashua, NH (US)

( * ) Notice: Subject to any disclaimer, the term of this patent is extended or adjusted under 35 U.S.C. 154(b) by 459 days.

This patent is subject to a terminal disclaimer.

(21) Appl. No.: 10/991,924

(22) Filed: Nov. 18, 2004

(65) Prior Publication Data

US 2006/0060900 A1 Mar. 23, 2006

Related U.S. Application Data

(60) Provisional application No. 60/611,454, filed on Sep. 20, 2004, provisional application No. 60/624,390, filed on Nov. 2, 2004.

(51) Int. Cl.
*C04B 35/495* (2006.01)
*C04B 35/499* (2006.01)
*H01L 41/187* (2006.01)

(52) U.S. Cl. .............. 501/135; 501/136; 501/137; 252/62.9 R; 252/62.9 PZ (58) Field of Classification Search ............ 501/134, 501/135, 136, 137, 138, 139; 252/62.9 R, 252/62.9 PZ
See application file for complete search history.

(56) References Cited

U.S. PATENT DOCUMENTS

| | | | |
|---|---|---|---|
| 5,312,790 A | 5/1994 | Sengupta et al. | 501/137 |
| 5,427,988 A | 6/1995 | Sengupta et al. | 501/137 |
| 5,486,491 A | 1/1996 | Sengupta et al. | 501/137 |
| 5,593,495 A | 1/1997 | Masuda et al. | 117/4 |
| 5,635,433 A | 6/1997 | Sengupta | 501/137 |
| 5,635,434 A | 6/1997 | Sengupta | 501/138 |
| 5,640,042 A | 6/1997 | Koscica et al. | 257/595 |
| 5,693,429 A | 12/1997 | Sengupat et al. | 428/699 |
| 5,694,134 A | 12/1997 | Barnes | 343/700 |
| 5,733,831 A * | 3/1998 | Takada et al. | 501/135 |
| 5,759,432 A * | 6/1998 | Kumar et al. | 252/63.9 R |
| 5,766,697 A | 6/1998 | Sengupta et al. | 427/585 |
| 5,830,591 A | 11/1998 | Sengupta et al. | 428/701 |
| 5,846,893 A | 12/1998 | Sengupta et al. | 501/137 |
| 5,886,867 A | 3/1999 | Chivukula et al. | 361/311 |
| 5,990,766 A | 11/1999 | Zhang et al. | 333/205 |
| 6,074,971 A | 6/2000 | Chiu et al. | 501/139 |
| 6,377,142 B1 | 4/2002 | Chiu et al. | 333/238 |
| 6,377,217 B1 | 4/2002 | Zhu et al. | 343/700 |
| 6,377,440 B1 | 4/2002 | Zhu et al. | 361/311 |
| 6,404,614 B1 | 6/2002 | Zhu et al. | 361/277 |
| 6,492,883 B2 | 12/2002 | Liang et al. | 333/132 |
| 6,514,895 B1 | 2/2003 | Chiu et al. | 501/137 |
| 6,525,630 B1 | 2/2003 | Zhu et al. | 333/205 |
| 6,531,936 B1 | 3/2003 | Chiu et al. | 333/164 |
| 6,535,076 B2 | 3/2003 | Partridge et al. | 333/17.1 |
| 6,538,603 B1 | 3/2003 | Chen et al. | 342/372 |
| 6,556,102 B1 | 4/2003 | Sengupta et al. | 333/161 |
| 6,590,468 B2 | 7/2003 | du Toit et al. | 333/17.3 |
| 6,597,265 B2 | 7/2003 | Liang et al. | 333/204 |
| 6,737,179 B2 * | 5/2004 | Sengupta | 428/702 |
| 6,774,077 B2 * | 8/2004 | Sengupta et al. | 501/137 |
| 6,905,989 B2 * | 6/2005 | Ellis et al. | 501/32 |
| 6,960,546 B2 * | 11/2005 | Caspers et al. | 501/135 |
| 7,056,468 B2 * | 6/2006 | Chiu et al. | 264/650 |
| 7,297,650 B2 * | 11/2007 | Chiu et al. | 501/134 |
| 2002/0165080 A1 * | 11/2002 | Sengupta et al. | 501/137 |
| 2003/0073565 A1 * | 4/2003 | Ellis et al. | 501/32 |
| 2003/0119656 A1 * | 6/2003 | Chiu et al. | 501/138 |
| 2004/0063566 A1 * | 4/2004 | Caspers et al. | 501/134 |
| 2004/0089985 A1 * | 5/2004 | Sengupta et al. | 264/614 |

* cited by examiner

*Primary Examiner*—Karl E Group
(74) *Attorney, Agent, or Firm*—James S Finn, Esq (57) ABSTRACT

An embodiment of the present invention provides an electronically tunable dielectric material, comprising at least one electronically tunable dielectric phase and at least one compound of low loss complex perovskites. The at least one electronically tunable dielectric phase may be selected from the group consisting of barium strontium titanate, barium titanate, strontium titanate, barium calcium titanate, barium calcium zirconium titanate, lead titanate, lead zirconium titanate, lead lanthanum zirconium titanate, lead niobate, lead tantalate, potassium strontium niobate, sodium barium niobate/potassium phosphate, potassium niobate, lithium niobate, lithium tantalate, lanthanum tantalate, barium calcium zirconium titanate, sodium nitrate, and combinations thereof. Further, the barium strontium titanate may of the formula $Ba_xSr_{1-x}TiO_3$, where x is from about 0 to about 1, or more specifically, but not limited in this respect, may also be of the formula $Ba_xSr_{1-x}TiO_3$, where x may be from about 0.15 to about 0.65 or from about 0.25 to about 0.60.

24 Claims, 9 Drawing Sheets

TUNABLE LOW LOSS MATERIAL COMPOSITION

CROSS REFERENCE TO RELATED PATENT APPLICATION

This application claims the benefit of U.S. Provisional Patent Application No. 60/611,454, filed Sep. 20, 2004, entitled, "TUNABLE LOW LOSS CERAMIC COMPOSITES COMPOUNDS BASED ON A BARIUM STRONTIUM TITANATE/BARIUM MAGNESIUM TANTALATE/NIOBATE SYSTEM". This application also claims the benefit of U.S. Provisional Patent Application No. 60/624,390, filed Nov. 2, 2004, entitled, "TUNABLE LOW LOSS CERAMIC COMPOSITES COMPOUNDS BASED ON A BARIUM STRONTIUM TITANATE/BARIUM MAGNESIUM TANTALATE/NIOBATE SYSTEM".

BACKGROUND OF THE INVENTION

The lack of the existence of low cost, effective tuning technology is problematic in the industry of microwave components and antennas to name a few. Tuning may be defined as the ability to change a dielectric constant and translates in the microwave component field as being able to use the same component and change the frequency of operation by just changing the input voltage. It may allow for a single filter to frequency hop during operation. For the antenna world, being able to tune using low cost technology would create a new class of antennas referred to as phased array antennas that could be used in the common household instead of being limited to large government systems. Phased array antennas may be described as electronically scanning antennas. It is understood that although the present background may describe the shortcomings of one use of tunable material, to wit, phased array antennas, it is appreciated that the present invention is not limited to antennas.

Presently, there are methods to tune and build phased array antennas. One problem with existing methods is that they are not low cost and/or they are cumbersome and therefore limit the usage. Thus, what is needed is a new class of materials for these types of phased array antennas that would facilitate the antennas being more compact, lighter, have less expensive hardware costs, and be less expensive to operate Existing technologies for scanning that have been tried for practical phase shifter applications are ferrite phase shifters and semiconductor-diode phase shifters. Although ferrites are currently the most widely used type of phase shifter materials, they are mostly limited to military applications. The major reason for this is that they are very expensive to manufacture. Also, they are not designed to work in a broadband situation. When the frequency changes, a whole new set of materials has to be designed and manufactured. Further, they are also very bulky in size and heavy and these phase shifters can not be made in a planar fashion. Ferrites are also driven by high power due to the fact that they activate based on current.

Diode phase shifters are high cost because they require active electronic circuits to be added to the design in order to compensate for their high loss at microwave frequencies and do not have good power handling characteristics. When power is put through the diode they start to behave in a very non-linear fashion or they breakdown. Diodes also require holding power in order to maintain accuracy as well as power during switching.

Thus, what is needed is a low loss but still tunable composite material with reasonable dielectric constants and a method of producing such material and applications utilizing this material.

SUMMARY OF THE INVENTION

In an embodiment of the present invention, the compound of low loss complex perovskites may comprise $A[B1_{1/3} B2_{2/3}]O_3$ materials, where A=Ba, Sr or the combination of Ba and Sr; B1=Mg, Zn or the combination of Mg and Zn; B2=Ta, Nb or the combination of Ta and Nb. Further, the compound of low loss complex perovskites may comprise from about 0.001 to about 50 weight percent of the material; or from about 0.01 to about 20 weight percent of the material; or from about 0.1 to about 5 weight percent of the material. In an embodiment of the present invention the material may be a composite comprising the electronically tunable material combined with and at least one other family of materials and the other family of materials may be from rare earth oxides, glasses, metal silicates, metal oxides and/or metal titanates. Further, the rare earth oxides may comprise the oxides of scandium (Sc), yttrium (Y), lanthanum (La), cerium (Ce), praseodymium (Pr), neodymium (Nd), promethium (Pm), samarium (Sm), europium (Eu), gadolinium (Gd), terbium (in), dysprosium (Dy), holmium (Ho), erbium (Er), thulium (Tm), ytterbium (Yb), lutetium (Lu) and any combination of the above; the rare earth oxides may comprise the oxide of Sc, Y, La, Ce, Pr, Nd, Sm, Dy, Gd, Ho and/or Er and further comprise $CeO2$. Also, the percentage of rare earth oxides may comprise from about 0.001 to about 5 mole percent of the electronically tunable dielectric phase; or from about 0.01 to about 3 mole percent of the electronically tunable dielectric phase; or from about 0.1 to about 2 mole percent of the electronically tunable dielectric phase.

In an embodiment of the present invention and not limited in this respect, the glasses may be selected from the group consisting of: boron, barium, calcium, lithium, manganese, silicon, zinc and/or aluminum-containing glasses. Further, the glasses may comprise an amount up to 50 weight percent of the materials and may comprise from about 0.1 to about 25 weight percent of the materials.

In an embodiment of the present invention and not limited in this respect, the metal silicates may comprise metals from group 2A of the Periodic Table and further the metal silicates may comprise $Mg_2SiO_4$, $CaSiO_3$, $BaSiO_3$ and $SrSiO_3$ and be from about 0.1 to about 80 weight percent; or more specifically from about 5 to about 60 weight percent or from about 0.01 to about 1 weight percent (again, it is understood that this is but one embodiment of the present invention and articulated percentages are merely illustrative of operable parameters and not meant to limit the present invention in any way).

Another embodiment of the present invention provides a method of making an electronically tunable dielectric material comprising, mixing particles of at least one electronically tunable dielectric phase and particles of at least one compound of low loss complex perovskites, and optionally particles of one other family of materials; and sintering said material. The at least one electronically tunable dielectric phase may be selected from barium strontium titanate, barium titanate, strontium titanate, barium calcium titanate, barium calcium zirconium titanate, lead titanate, lead zirconium titanate, lead lanthanum zirconium titanate, lead niobate, lead tantalate, potassium strontium niobate, sodium barium niobate/potassium phosphate, potassium niobate, lithium niobate, lithium tantalate, lanthanum tantalate, barium calcium zirconium titanate, sodium nitrate, and combinations thereof.

Further, compound of low loss complex perovskites may comprise $A[B1_{1/3}B2_{2/3}]O_3$ materials, where A=Ba, Sr or the combination of Ba and Sr; B1=Mg, Zn or the combination of Mg and Zn; B2=Ta, Nb or the combination of Ta and Nb. In the present method, the other family of materials may be from rare earth oxides, glasses, metal silicates, metal oxides and/or metal titanates and the average particle size may be from about 0.001 to about 5 micron—although the present invention is not limited to these particle sizes.

Yet another embodiment of the present invention provides a method of manufacturing a thin film electronically tunable dielectric material, comprising depositing at least one electronically tunable dielectric phase and at least one compound of low loss non-tunable phase on a substrate, wherein said depositing may comprise at least one of mechanical, chemical and evaporation. Further, the depositing may comprise at least one of RF sputtering, pulsed laser deposition, pulsed electron deposition, sol-gel processing, metal organic decomposition (MOD), and chemical vapor deposition (CVD). Also, the at least one electronically tunable dielectric phase may be selected from barium strontium titanate, barium titanate, strontium titanate, barium calcium titanate, barium calcium zirconium titanate, lead titanate, lead zirconium titanate, lead lanthanum zirconium titanate, lead niobate, lead tantalate, potassium strontium niobate, sodium barium niobate/potassium phosphate, potassium niobate, lithium niobate, lithium tantalate, lanthanum tantalate, barium calcium zirconium titanate, sodium nitrate, and combinations thereof and the compound of low loss non-tunable phase may comprise complex perovskite $A[B1_{1/3}B2_{2/3}]O_3$ materials, where A=Ba, Sr or the combination of Ba and Sr; B1=Mg, Zn or the combination of Mg and Zn; B2=Ta, Nb or the combination of Ta and Nb. Lastly, in the compound, the other family of materials may be selected from the group consisting of: rare earth oxides, glasses, metal silicates, metal oxides and/or metal titanates.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DESCRIPTION OF THE PREFERRED EMBODIMENT

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

An embodiment of the present invention provides ceramic materials having desirable properties for applications such as phased array antenna systems and capacitors—although the present invention is not limited in this respect. These materials are advantageous in comparison with other currently employed ferroelectric materials because they have enhanced electronic properties, which can be tailored for specific applications. For example, the present materials have equivalent loss characteristics in comparison with current BSTO composites, combined with significantly increased lifetime and temperature stability. The present materials are attractive for commercial and military applications in, for example and not limited to, phase shifters, delay line, and other wireless communication devices, low powered capacitors, pyroelectric devices and the like. In addition, tunability of the materials remains high, e.g., well within requirements for applications such as, but not limited to, phased array antenna systems.

The present electronically tunable ceramic compositions may comprise at least one electronically tunable dielectric phase, such as barium strontium titanate. Barium strontium titanate of the formula $Ba_xSr_{1-x}TiO_3$ is a preferred electronically tunable dielectric material due to its favorable tuning characteristics, low curie temperatures and low microwave loss properties. In the formula $Ba_xSr_{1-x}TiO_3$, x can be any value from 0 to 1, preferably from about 0.15 to about 0.65 or from 0.25 to 0.6.

Other electronically tunable dielectric materials may be used partially or entirely in place of barium strontium titanate. An example is $Ba_xSr_{1-x}TiO_3$, where x can vary from about 0.2 to about 0.8, preferably from about 0.4 to about 0.6. Additional electronically tunable ferroelectrics include $Pb_xZr_{1-x}TiO_3$ (PZT) where x ranges from about 0.05 to about 0.4, lead lanthanum zirconium titanate (PLZT), lead titanate (PbTiO_3), barium calcium zirconium titanate ($Ba_xSr_{1-x}TiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)_5$ $KH_2PO_4$.

The family of complex perovskites of the present invention may include $A[B1_{1/3}B2_{2/3}]O_3$ materials, where $A=Ba_xSr_{1-x}$ (x can be a value from 0 to 1); $B1=Mg_yZn_{1-y}$ (y can be a value from 0 to 1); $B2=Ta_zNb_{1-z}$ (z can be a value from 0 to 1). The complex perovskite may typically be present in an amount up to about 60 weight percent of the material, preferably from about 0.001 to about 50 weight percent, or from about 0.1 to about 20 weight percent or from about 0.5 to about 10 total weight percent of the material.

In an embodiment of the present invention, materials may comprise $(Ba_{1-x}Sr_xTiO_3)(A[B1_{1/3}B2_{2/3}]O_3)$ ferroelectric composite material doped with rare earth oxides, where x is greater than or equal to zero and less than or equal to 1, and where the amount of the BSTO may range from about 10 to 99.75 weight percent of the composite. Preferably, the rare earth oxide is added in an amount less than or equal to 5.0 mole percent, and more preferably from 0.1 to 1 mole percent.

Suitable rare earth oxide dopants include oxides of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Where the rare earth element is represented by M, the oxides are generally of the formula $M_2O_3$, although cerium gives cerium oxide $CeO_2$. The rare earth oxide additives of the present invention include all oxidation states of the rare earth elements. Thus, the materials may be represented generally as (BSTO)(A[B1B2]O)(REO). The A[B1B2]O compound may be, for example, $Ba[Mg_{1/3}Ta_{2/3}]O_3$, so that the composite comprises BSTO-$Ba[Mg_{1/3}Ta_{2/3}]O_3$-RE oxide. The doping may be carried out with combinations of rare earth oxides as opposed to individually. Although not limited in this respect, the percentage of rare earth oxides may range from less than or equal to 5.0 mole percent.

In accordance with the present invention, the electronically tunable materials may include a glass additive. The glass additive may comprise a low loss glass frit in an amount up to 50 weight percent of the material. The glass frit may typically comprise from about 0.1 to about 25 weight percent of the material. As used herein, the term "loss" means microwave energy dissipation. The term "low loss glass" means a glass composition that exhibits a relatively low dielectric loss, e.g., less than 0.003, preferably less than 0.001, at a frequency of about 2 GHz. Suitable low loss glasses include, for example, boron, barium, calcium, lithium, manganese, silicon, zinc and/or aluminum-containing glasses. Suitable boron-containing glasses may include at least one additional element selected from Si, Al, Li, Na, K, Ba, Zn, Mn and Ca. For example, some types of borosilicate glass may be suitable. Suitable calcium-containing glasses may include at least one additional element selected from B, Al, Si, Ba, Zn, Li, Mn and Sr. Suitable aluminum-containing glasses may include at least one additional element selected from Si, B, Li, Na, K, Ba, Zn, Mn, Ca, Sr and Mg.

In addition to the rare earth and glass additives, the family of silicates may also be used in the present invention. The metal silicates may include metals from group 2A of the Periodic Table, i.e., Be, Mf, Ca, Sr, Ba and Ra, preferably Mg, Ca, Sr and Ba. Preferred metal silicates include $Mg_2SiO_4$, $CaSiO_3$, $BaSiO_3$ and $SrSiO_3$. Other combinations may be from group 1A such as Sodium Silicates and other metallic compounds such as $Al_2Si_2O_7$, $LiAlSiO_4$. The metal silicate is typically present in an amount of from about 0.1 to about 80 weight percent, preferably from about 3 to 65 weight percent, and more preferably from about 5 to 60 weight percent— although the present invention is not limited to the percentages and the aforementioned percentages are for illustrative purposes only. Although metal silicates in amounts from 1 to 80 weight percent are typically used, smaller additive amounts of from 0.01 to 1 weight percent may be used for some applications.

In addition to the additives from rare earth, glass and silicate, the present invention may include optional metal oxides and/or metal titanates. For example, $Ca_2NB_2O_7$ (CN) and $CaTiO_3$ (CT), may be used. Such additional materials may be present in amounts up to about 20 weight percent.

Dielectric constant is related to the energy storage in the material. In general, the dielectric constant should be low. A lower dielectric constant is preferable for wave-guides so that impedance matching for the circuit is easier. A low dielectric constant does not decrease the phase shifting ability of the material if a sufficient length of the material is used, as insertion loss does not depend on dielectric constant. Also, since the loss tangent (tan δ) increases with increasing dielectric constant for these ferroelectric materials, lower dielectric constant materials tend to have lower loss tangents, and, therefore, less insertion loss. The dielectric constants of the present materials may range from about 15 to 1,500, and may be tailored to a particular application, although the present invention is not limited in this respect. In many cases, a lower dielectric constant on the order of 100 is needed for ease of matching into the circuit. A lower dielectric constant is preferable for waveguides so that impedance matching is easier. In other cases, such as varactor based filters, a higher dielectric constant such as 300 to 800 may be needed to achieve the correct capacitance required for a specific frequency band. For some RF applications, such as delay lines, very high dielectric constants, e.g., 800 to 1,000, may be needed to obtain the correct delay.

The loss tangent (intrinsic to the material) is related to the power dissipation in a material, i.e., it is a measure of how a material serves to dissipate or absorb incident energy (microwave). A material is most effective in antenna devices when the loss tangent is in the range of 0.001 or less. The low loss tangent serves to decrease the insertion loss and hence increase the phase shifting per decibel of loss. Generally, as the frequency of operation increases, the dielectric loss tangent also increases. This restricts the microwave designer's ability to develop efficient high frequency devices.

As used herein, the term "electronically tunable dielectric material" means a material that exhibits a variable dielectric constant upon the application of a variable voltage. The term "voltage tunable dielectric material" as used herein means a material that exhibits a variable dielectric constant with a variable applied voltage. For voltage tunable materials, tunability is a measure of how much the dielectric constant changes with applied voltage and is defined as $T=(\in_0-\in V)/\in_0$ wherein T=tunability; $\in_0$=dielectric constant with no applied voltage; and $\in V$=dielectric constant with an applied voltage. The amount of phase shift ability is directly related to tunability, therefore, higher tunabilities are desired. The tunability of a material under an electric field of 2.0 V/μm can range from 0% to 70% depending upon the material employed. For example, electronic tunabilities at an electric field strength of 8 V/μm may range from 20% to 70% or higher for the present bulk materials.

In addition to these electronic properties, there are other advantages to the present compositions. The present materials exhibit favorable temperature stability. These materials also show a good resistance to breakdown even at high electrical field. For example, several of the present compositions have been held at 100 V/μm for several days without breakdown—although it is understood that the present invention is not limited to these performance parameters.

Another advantage is that the tuning remains almost the same while the dielectric loss is decreased from that of conventional composites. In addition, the dielectric constant of the composites may be adjusted without decreasing tuning and increasing dielectric loss, which enable new RF applications not previously possible.

Time and bias stability may be defined as the intrinsic ability of the material to resist dielectric breakdown. Conversely, the lifetime of the material is the time necessary to induce intrinsic dielectric breakdown in the material. As known to those skilled in the art, exaggerated voltage and temperature test conditions may be correlated to the requirements of a given application.

Temperature stability allows these materials to be used in applications where there is a wide range of operating temperatures, thereby minimizing the need for environmental controls. This is extremely beneficial for expanding the applications of tunable materials in both the commercial and military industries.

One method of producing the herein described material according to one embodiment of the present invention begins by obtaining powders of barium titanate ($BaTiO_3$) and strontium titanate ($SrTiO_3$). The powders may then be stoichiometrically mixed in a slurry of organic solvent, such as ethanol, and ball milled in a conventional manner using grinding media. An aqueous solvent, such as deionized water, may also be used as the solvent. This particular mixture may then be air-dried and calcined at approximately 200-300 degrees below the sintering temperature for several hours. The resulting BSTO powder may then be sieved and mixed with complex perovskites, for example $Ba[Mg_{1/3}Ta_{2/3}]O_3$, and, if applicable, the additive from other families of materials, for example, $CeO_2$, in the correct ratios and re-ball milled in an organic solvent with a binder. Again, an aqueous solvent, such as deionized water, may be used as the solvent. The final mixture may then be air-dried and subsequently dry pressed to near net shape at about 7,000 psi. The final samples are sintered at the correct temperatures. Sintering schedules may be ascertained by those skilled in the art using a dilatometer. After sintering, the sample may be machined and electroded for usage and analysis.

The present materials may then be produced by conventional manufacturing processes. For example, powder forms of $BaTiO_3$ and $SrTiO_3$ may be mixed to form the desired stoichiometry of the electronically tunable dielectric phase. The powders may be ball-milled in either a liquid solvent or deionized water, or dry mixed with ceramic grinding media for approximately 24 hours. These powders may then be allowed to dry. The mixed powder may then be calcined at temperatures of about 800° C. to about 1,200° C. to form BSTO. The calcined powder may then undergo another mixing step with powders of the complex perovskite and other families of materials in the desired ratios to form the composite. This mixing step may be performed in a liquid medium or dry. During mixing conventional binders may or may not be added. Although not limited in this respect, the powders preferably may have an average particle size of from about 0.001 to about 5 micron or more preferably from about 0.1 to about 2.5 micron. After mixing, the composite powder is then dried and ground to a workable particle size. At this point the powder may be made into several different forms that can be characterized as bulk materials, thick films or thin films.

The composite powder made using the above specifications may be compacted to form a shape. This process may be performed by isostatic pressing, uniaxial pressing or the like. The green ceramic body is then fired at the appropriate temperature in order to densify the compact. Electrodes may be placed on the sintered ceramic via a hybrid or thin film method to the specifications of a desired design.

The composite powder may also be blended with a polymeric binder for tape casting. The tape casting slurry may be pumped into a tape caster with a doctor blade set for a desired thickness. As the caster moves a carrier sheet such as Mylar under the doctor blade, the slurry forms a film of the desired thickness. The film may be allowed to dry and then cut and/or slit to the shape needed. This green body is then fired with the appropriate binder burn out schedule. The sintered part may undergo an annealing stage dependent upon the quality of the fired tape. The tapes may then be electroded in a manner similar to the bulk material.

Alternatively, the composite powder may be mixed with a polymeric binder for screen printing. The slurry may be gently blended and then placed in a 3-roll mill or attritor mill to thoroughly mix the slurry. The ceramic ink may then be printed using a screen with the appropriate mesh and emulsion for the desired finished print thickness. The ceramic may be printed onto any suitable substrate, e.g., a ceramic substrate such as MgO. The films are then metallized with a pattern necessary for the desired device. For example, in the case of varactors, over one hundred varactors may be put on a single 1" by 1" chip and diced out for placement into microwave devices.

The fabrication processes primarily described herein deal with the production of bulk materials and thick film slurries. However, other suitable processing methods include ink printing, die casting, injection molding, uniaxial pressing, isostatic pressing, tape casting, roll compaction and any now known or later developed processing methods.

In accordance with an embodiment of the invention, the present materials may be provided in the form of a uniaxially pressed bulk part. Alternatively, large bulk parts of the present materials may be made by isostatic pressing. To press a uniaxial part, the powders may include a conventional binder to help hold the part together. For example, the pressed material may contain a basic acrylic binder in an amount of 2 percent by weight. The powder may be measured, placed in a metal die, and pressed to a pressure between 5,000 and 10,000 psi. In the case of isostatic pressing, the powder may be packed into a molded rubber container. The container may be sealed with only a small tube opening and this tube may then be attached to a vacuum pump and the air is pumped out of the bag. After the vacuum sealing process is done, the tube may be clamped and the bag may be placed in a container in an isostatic press. The isostatic press typically uses hydraulic pressure to apply from 30,000 to 60,000 psi of pressure to the part. The green ceramic density may be, for example and not by way of limitation, approximately 60 percent of theoretical.

In accordance with another embodiment, tape casting techniques may be used to make various types of components comprising the present materials. Tape cast parts may be made by adding a conventional dispersant and solvent system to a jar mill with the powders and liquid mixing media and mixing balls. Dispersion may be performed typically from 18 to 24 hours, although this time frame is not required. After the dispersion process, conventional plasticizers and binders are preferably added and the total mixture may be mixed for several hours. The resultant tape slurry may then be de-aired by vacuum. At this point, the slurry may be injected into a tape caster and cast. The tape may then be dried, cut and sintered. The sintering process typically includes a binder burn out stage and a sintering stage, although the present invention is not limited in this respect and these stages are not required.

Another processing technique is to screen print a film of the present material. For example, powder forms of BaTiO$_3$ and SrTiO$_3$ may be mixed to form the desired stoichiometry. The powders may be ball-milled in either a liquid solvent, deionized water or dry mixed with ceramic grinding media for several hours. These powders may then be allowed to dry. The mixed powder may then be calcined to form BSTO. The calcined powder then undergoes another mixing step with powders of the complex perovskite and other families of materials in the desired ratios to form the ceramic composite. This mixing may be performed in either a liquid medium or dry. The composite powder may then be dried and ground to a workable particle size. At this point, the powder may be mixed in the desired ratio with a screen print binder system that preferably contains a combination of medium and solvent. The ratio of ceramic filler in many cases may be based on a 70 to 75 percent solids loading by weight. The resultant ink may be mixed on a 3-roll mill. However, other mixing methods may be suitable. A typical amount of time for mixing is about 30 minutes, although it is understood that this mixing time is for exemplification purposes only. During the mixing process, the powder may be allowed to flow through the mill to allow for uniform mixing. A viscosity test is preferably performed after the ink is made. The viscosities of the inks usually range from 35,000 to 65,000 cps, depending on the screens and the types of patterns that will be printed. Other tests such as rheology tests may be performed as needed depending on the application.

In one embodiment, once the present materials are printed or formed, microwave structures may be placed on top of the films. For example, a varactor may be made by printing a thick film ink of the tunable dielectric onto a substrate by a screen printing process. The dielectric ink may be forced through a wire screen in a pattern that is determined by the screen. The dielectric pattern may then be sintered. The substrate then undergoes a conventional lift-off photolithography process and E-beam gold deposition process. The photoresist may then be stripped and the patterned gold remains on the substrate. Hundreds of varactors may be made on the substrate. Each of the varactors may be cingulated by a dicing saw and each of the varactors may be tested by known techniques.

Other types of thick film structures include vertical capacitors where a metallic layer may be printed and fired, then the ceramic may be fired on top. The process for making this type of device may be similar to that described for the varactors. The difference is that a film of, e.g., platinum may be placed on the substrate prior to the thick film in order to form a bottom electrode. A subsequent step would be to place a pattern on top of the ceramic substrate. Thin films of these materials may also be produced by mechanical, chemical and evaporation methods. For example, a bulk target of present materials can be made from the processes described above. The target materials will then be deposited on to a wafer with or without bottom electrode as desired using pulsed laser deposition. The wafer may then be processed with top electrodes and/or passivation layers according to the design. The final devices may then be singularized for RF tunable applications as desired. Other examples of a thin film deposition method can be, but is not limited to, any one of: RF sputtering; pulsed electron deposition; sol-gel processing; metal organic decomposition (MOD); and chemical vapor deposition (CVD).

Turning now to the figures are examples which illustrate various aspects and are provided for illustrative purposes only and should not be considered to limit the present invention. The compositional designations for the materials listed in figures mean the weight and mole percentage of different phases. For example, 45005BMT.10CT50MS means that the sample contains 40, 10 and 50 weight percent of 45.005BMT, Calcium Titanate (CT) and Magnesium Silicate (MS) respectively, while 45.005BMT contains 99.5 weight percent of Ba0.45Sr0.55TiO$_3$ (45BST) and 0.5 weight percent of Barium Magnesium Tantalate (BMT). Another example is 5001BMT.10MS05G.A01Ce. This composite contains 85, 10 and 5 weight percent of 50.01BMT, MS and Glass respectively, with additional 1 mole percent of Ce against BST, the 50.01 BMT means 99 weight percent of Ba$_{0.45}$Sr$_{0.55}$TiO$_3$ (45BST) and 1 weight percent of BMT.

Tables 1 through 6 below list compositions and electronic properties for some bulk materials in accordance with an embodiment of the present invention. Table 1 illustrates the properties of pure BST for comparison. It may be seen that with BMT additive, the dielectric loss decreased dramatically as shown in Table 2 (from 0.0649 to 0.0295 at 24 GHz in the case of 50.005BMT) while remaining the high tunability and dielectric constant. The properties may be further tailored with additives from other families of materials. Tables 2 through 6 show various dielectric constants and tunability achieved with low dielectric loss for different microwave applications. More specifically, Table 2 is a table of Low and High Frequency Data of BSTO with varying Weight Percent Barium Magnesium Tantalate (BMT); Table 3 is a table of Low and High Frequency Data of BSTO with varying Weight Percent Barium Magnesium Tantalate (BMT), Calcium Titanate (CT) and/or Magnesium Silicate (MS); Table 4 is a table of Low and High Frequency Data of BSTO with varying Weight Percent Barium Magnesium Tantalate and Cerium or Yttrium; Table 5 is a table of Low and High Frequency Data of BSTO with varying Weight Percent Barium Magnesium Tantalate and Glass; and Table 6 is a table of Low and High Frequency Data of BSTO with varying Weight Percent Barium Magnesium Tantalate and others.

Figure 1:
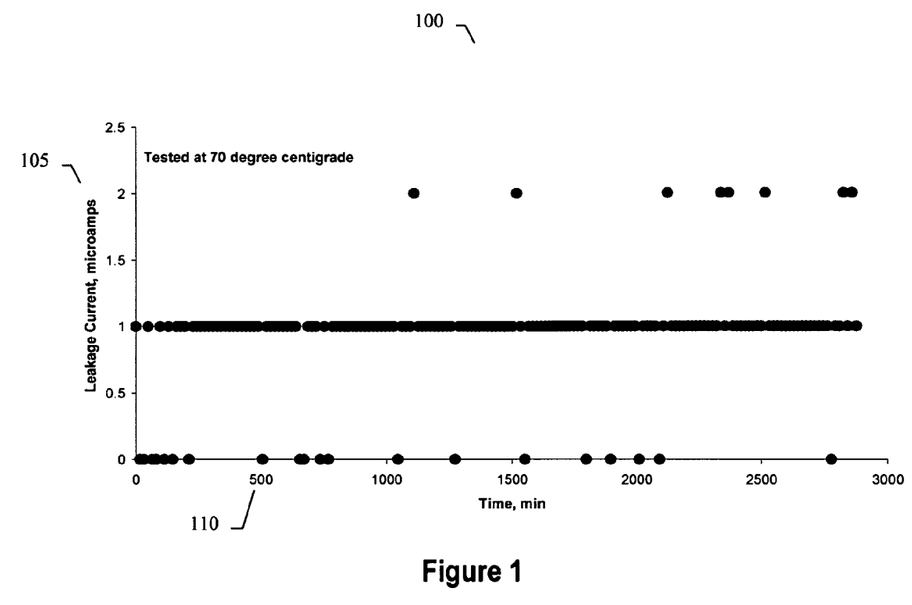
FIG. 1 graphically illustrates Leakage current of Screen Printed Co-Planar Thick Film BSTO with Barium Magnesium Tantalate and glass on MgO crystal substrate (15V/μm, 70° C., 48 hrs)
Figure 2:
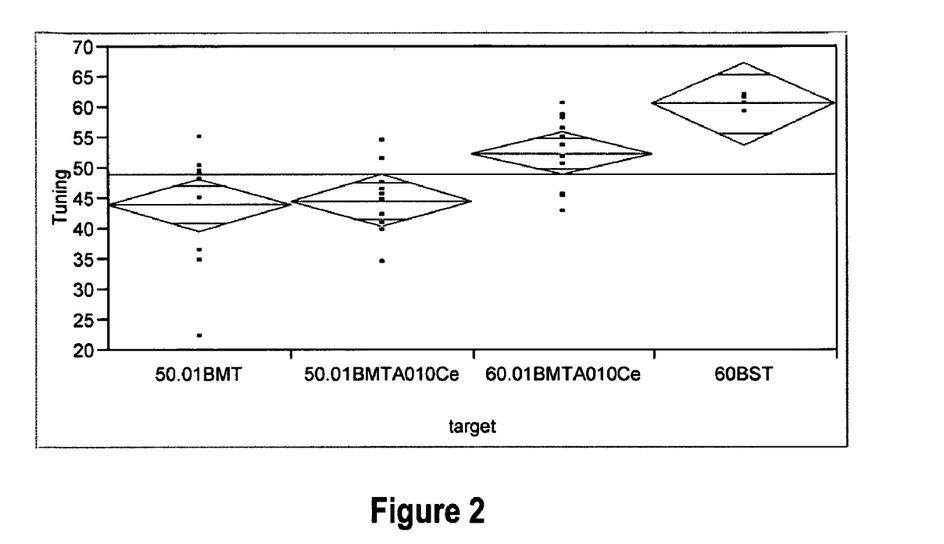
FIG. 2 graphically illustrates tuning of Co-Planar thin film BSTO with Barium Magnesium Tantalate and/or Cerium on MgO crystal substrate (37.5V/μm, 25° C.)
Figure 3:
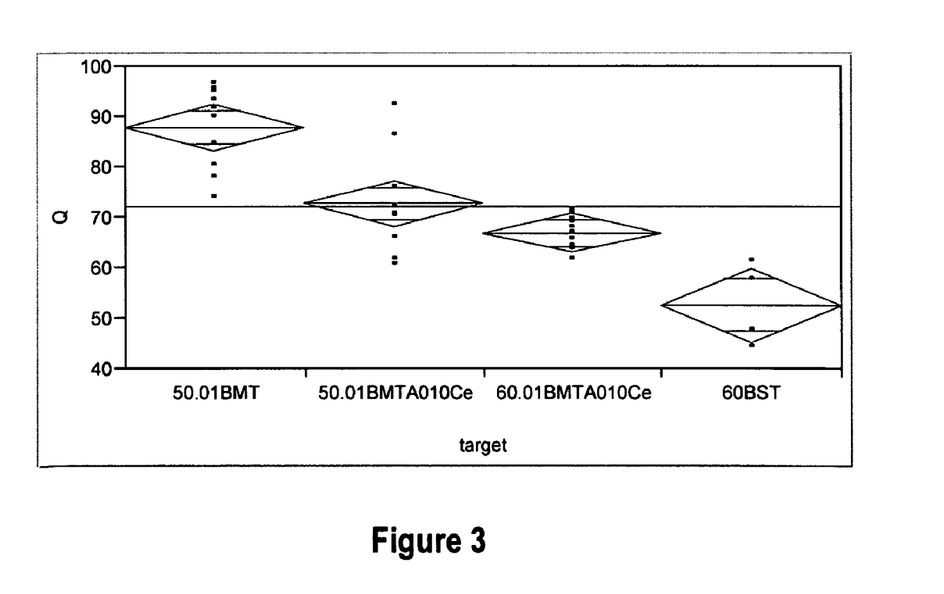
FIG. 3 graphically illustrates Q (2 GHz) of Co-Planar thin film BSTO with Barium Magnesium Tantalate and/or Cerium on MgO crystal substrate.

Turning now to Table 7 is a table of Tuning and Q (2 GHz) of Screen Printed Co-Planar Thick Film BSTO with Barium Magnesium Tantalate and different kind of glass on MgO crystal substrate. FIG. 1 graphically illustrates at 100 leakage current 105 vs time 110 of Screen Printed Co-Planar Thick Film BSTO with Barium Magnesium Tantalate and glass on MgO crystal substrate (15V/µm, 70° C., 48 hrs). FIG. 2 graphically illustrates tuning of Co-Planar thin film BSTO with Barium Magnesium Tantalate and/or Cerium on MgO crystal substrate (37.5V/µm, 25° C.). Distinguished from FIG. 2, FIG 3 graphically depicts the Q (2 GHz) of Co-Planar thin film BSTO with Barium Magnesium Tantalate and/or Cerium on MgO crystal substrate.

Figure 4:
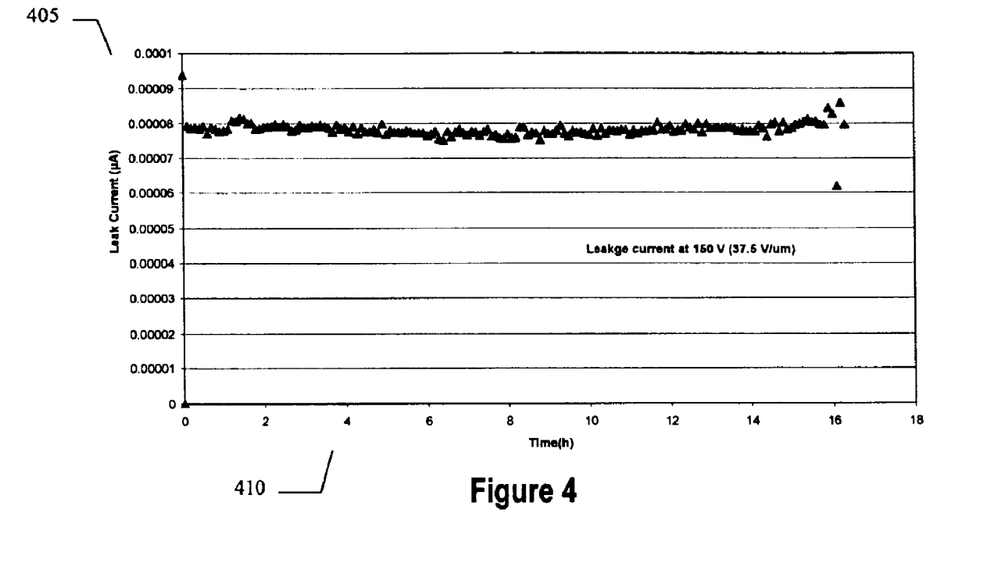
FIG. 4 graphically illustrates leakage current over time of Co-Planar thin film BSTO with Barium Magnesium Tantalate and Cerium on MgO crystal substrate (37.5V/μm, 25° C., 16 hrs)
Figure 5:
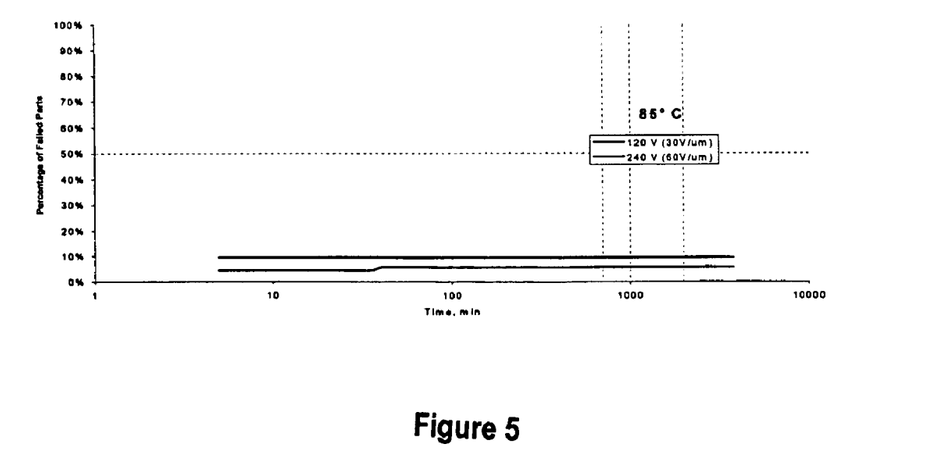
FIG. 5 graphically illustrates a life test at elevated temperature and field strength of Co-Planar thin film BSTO with Barium Magnesium Tantalate and Cerium on MgO crystal substrate (30V/μm and 60V/μm, 85° C., 3760 minutes)

Looking now at FIG. 4 is graphically illustrated the leakage current 405 over time 410 of Co-Planar thin film BSTO with Barium Magnesium Tantalate and Cerium on MgO crystal substrate (37.5V/µm, 25° C., 16 hrs). Further FIG. 5 graphically illustrates a life test at elevated temperature and field strength of Co-Planar thin film BSTO with Barium Magnesium Tantalate and Cerium on MgO crystal substrate (30V/µm and 60V/µm, 85° C., 3760 minutes).

Figure 6:
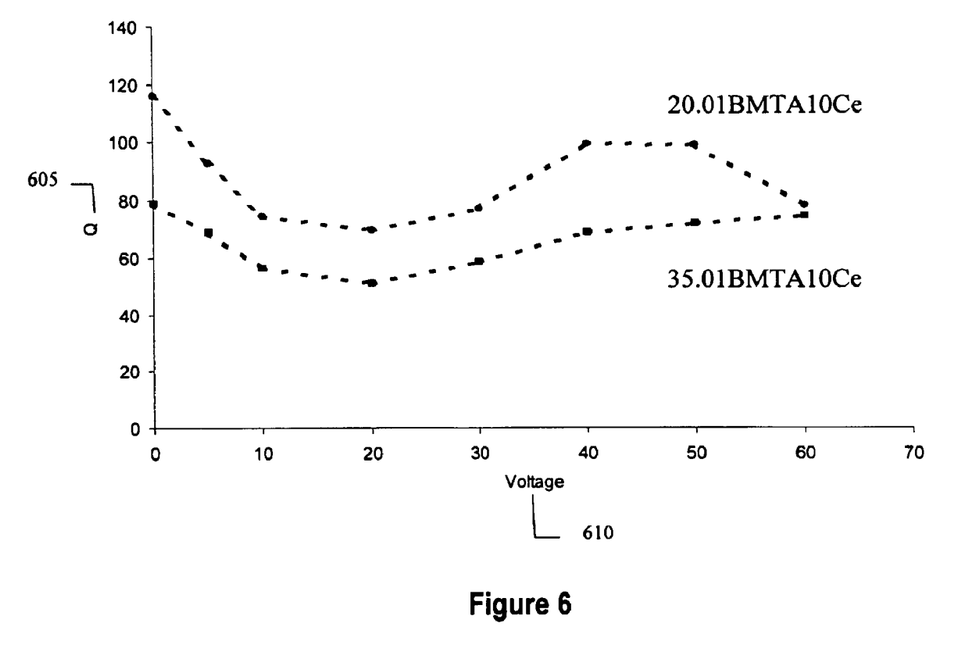
FIG. 6 graphically illustrates the Q (700 MHz) of vertical thin film BSTO with Barium Magnesium Tantalate and Cerium on MgO crystal substrate.
Figure 7:
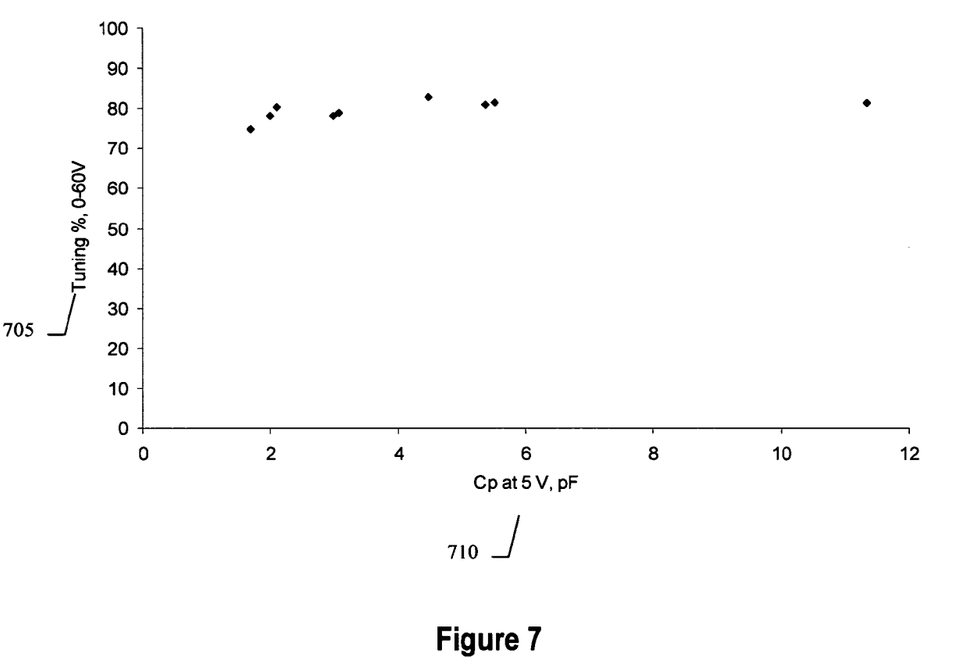
FIG. 7 graphically illustrates the tuning (0 to 60V, 100V/μm) of vertical thin film BSTO with Barium Magnesium Tantalate and Cerium on MgO crystal substrate.
Figure 8:
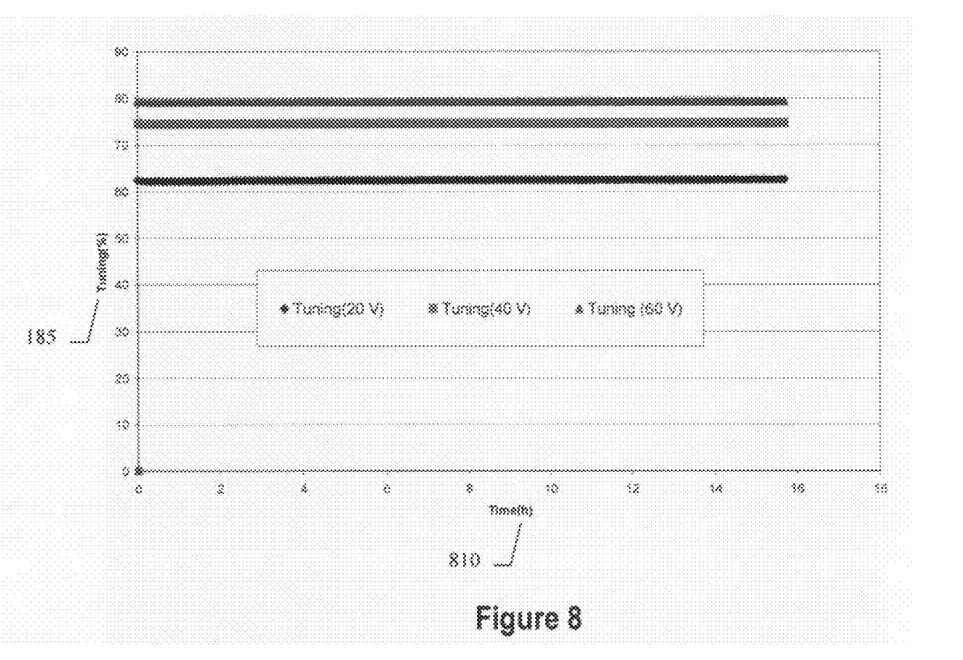
FIG. 8 graphically illustrates the tuning over time (cycles) at 25° C., 20V (33.3V/μm), 40V (66.6V/μm) and 60V (100V/μm) of vertical thin film BSTO with Barium Magnesium Tantalate and Cerium on MgO crystal substrate.

FIG. 6 illustrates the Q 605 (700 MHz) vs. voltage 610 of vertical thin film BSTO with Barium Magnesium Tantalate and Cerium on MgO crystal substrate and FIG. 7 graphically illustrates the tuning 705 vs. capacitance 710 (0 to 60V, 100V/µm) of vertical thin film BSTO with Barium Magnesium Tantalate and Cerium on MgO crystal substrate. FIG. 8 graphically shows the tuning 805 over time 810 (cycles) at 25° C., 20V(33.3V/µm), 40V(66.6V/µm) and 60V (100V/

µm) of vertical thin film BSTO with Barium Magnesium Tantalate and Cerium on MgO crystal substrate.

Figure 9:
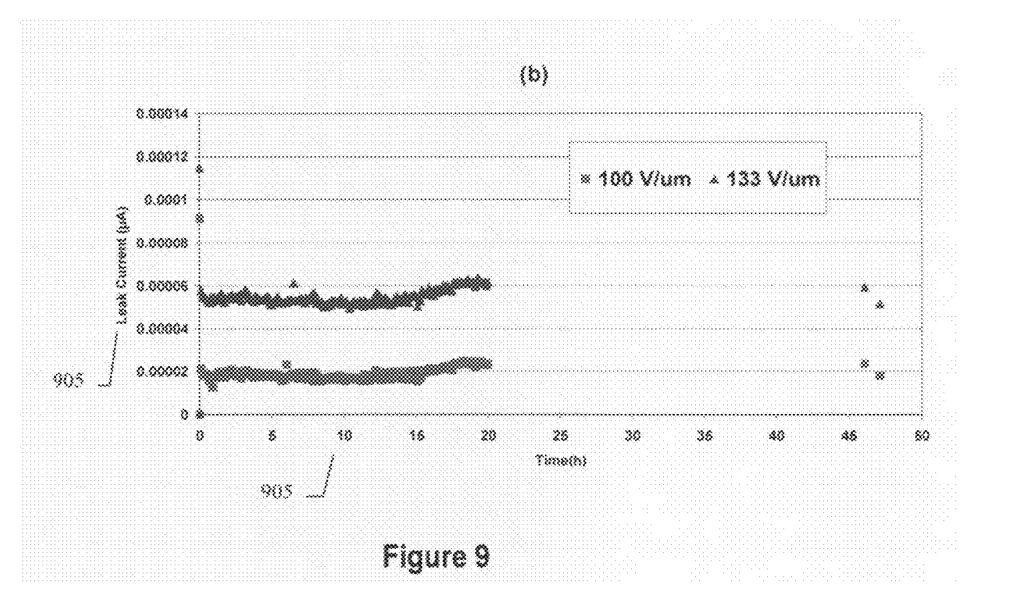
FIG. 9 graphically illustrates the leakage current over time of vertical thin film (a) BSTO (b) BSTO with Barium Magnesium Tantalate and Cerium on MgO crystal substrate (100V/μm & 133V/μm, 25° C., 47 hrs)
Figure 10:
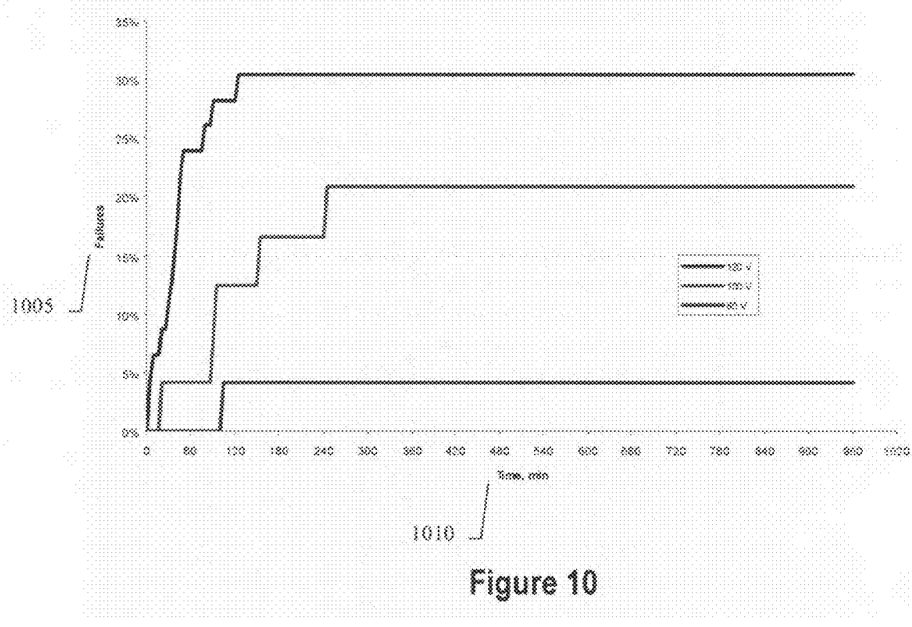
FIG. 10 graphically illustrates a life test at elevated temperature and field strength of vertical thin film BSTO with Barium Magnesium Tantalate and Cerium on MgO crystal substrate (125° C., 80 to 120V, 133 to 200V/μm, 16 hrs)
Figure 11:
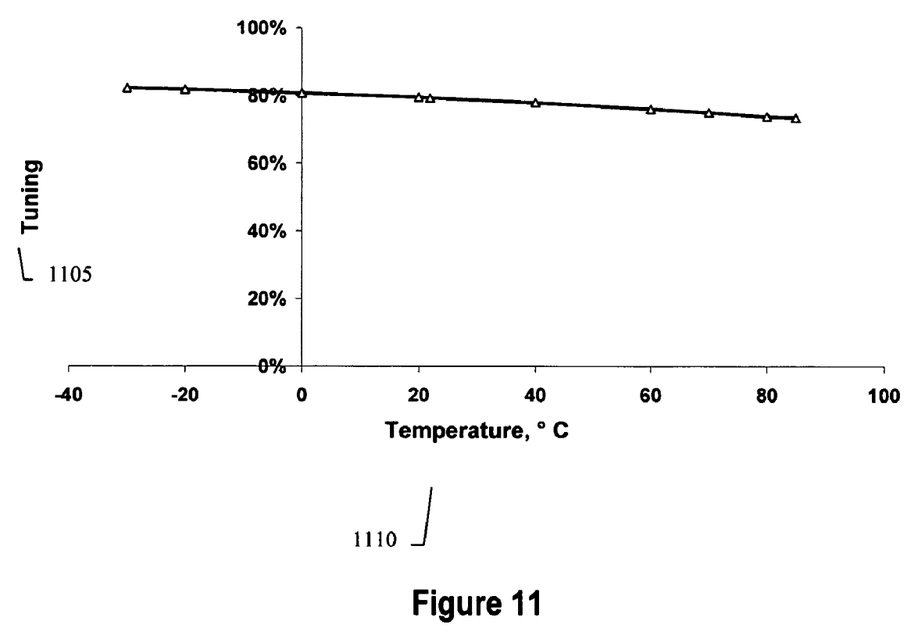
FIG. 11 graphically illustrates the Tunability (100V/μm) vs Temperature of BSTO with Barium Magnesium Tantalate and Cerium on MgO crystal substrate.

Turning now to FIG. 9 is graphically illustrated the leakage current 905 over time 910 of vertical thin film (a) BSTO (b) BSTO with Barium Magnesium Tantalate and Cerium on MgO crystal substrate (100V/µm & 133 V/µm, 25° C., 47 hrs) (leak current is shown at 915 vs time 920 in FIG. 16b). FIG. 10 illustrates a life test in failures 1005 vs time 1010 at elevated temperature and field strength of vertical thin film BSTO with Barium Magnesium Tantalate and Cerium on MgO crystal substrate (125° C., 80 to 120V, 133 to 200V/µm, 16 hrs). FIG. 11 illustrates the Tunability (100V/µm) 1105 vs Temperature 1110 of BSTO with Barium Magnesium Tantalate and Cerium on MgO crystal substrate.

TABLE 1

Low and High Frequency Data of pure $Ba_xSr_{1-x}TiO_3$ with varying x from 0.4 to 0.6 (40BST to 60BST)

| Composition | Tuning (%) 2 V/um | Tuning (%) 4 V/um | Tuning (%) 6 V/um | Tuning (%) 8 V/um | Dielectric Constant (1 MHz) | Dielectric Loss (1 MHz) | Dielectric Constant (24 GHz) | Dielectric Loss (24 GHz) |
|---|---|---|---|---|---|---|---|---|
| 40BST | 2.18 | 8.30 | 15.99 | 24.08 | 1132.3 | 0.0003 | 743.1 | 0.0177 |
| 45BST | 4.38 | 14.17 | 24.92 | 34.66 | 1368.1 | 0.0044 | 891.8 | 0.0227 |
| 50BST | 9.41 | 26.13 | 40.38 | 49.91 | 1813.7 | 0.0001 | 1142.4 | 0.0649 |
| 55BST | 18.72 | 42.32 | 57.01 | 65.97 | 2592.1 | 0.0004 | | |
| 60BST | 41.96 | 66.72 | 76.93 | 82.02 | 4448.1 | 0.0002 | | |

TABLE 2

Low and High Frequency Data of BSTO with varying Weight Percent Barium Magnesium Tantalite (BMT)

| Composition | Tuning (%) 2 V/um | Tuning (%) 4 V/um | Tuning (%) 6 V/um | Tuning (%) 8 V/um | Dielectric Constant (1 MHz) | Dielectric Loss (1 MHz) | Dielectric Constant (24 GHz) | Dielectric Loss (24 GHz) |
|---|---|---|---|---|---|---|---|---|
| 45005BMT | 4.21 | 15.40 | 27.05 | 37.29 | 1346.09 | 0.0005 | 894.19 | 0.0187 |
| 50005BMT | 7.52 | 23.22 | 37.16 | 47.90 | 1821.40 | 0.0001 | 1166.77 | 0.0295 |
| 5001BMT | 6.80 | 20.57 | 33.93 | 44.68 | 1743.23 | 0.01008 | 1134.80 | 0.02155 |
| 6001BMT | 28.09 | 55.37 | 68.39 | 75.23 | 3977.20 | 0.00165 | | |

TABLE 3

Low and High Frequency Data of BSTO with varying Weight Percent Barium Magnesium Tantalite (BMT), Calcium Titanate (CT) and/or Magnesium Silicate (MS)

| Composition | Tuning (%) 2 V/um | Tuning (%) 4 V/um | Tuning (%) 6 V/um | Tuning (%) 8 V/um | Dielectric Constant (1 MHz) | Dielectric Loss (1 MHz) | Dielectric Constant (24 GHz) | Dielectric Loss (24 GHz) |
|---|---|---|---|---|---|---|---|---|
| 45005BMT.10CT50MS | 4.97 | 15.07 | 23.50 | 30.14 | 143.7 | 0.00086 | 130.2 | 0.02392 |
| 45005BMT.10MS | 4.72 | 14.79 | 24.03 | 31.43 | 806.7 | 0.00034 | 701.8 | 0.01594 |
| 45005BMT.50MS | 4.69 | 13.88 | 21.82 | 28.16 | 142.6 | 0.00075 | 132.4 | 0.02580 |
| 50005BMT.10MS | 7.43 | 21.58 | 33.55 | 42.65 | 984.25 | 0.0006 | 726.69 | 0.0237 |
| 50005BMT.30MS | 7.75 | 22.42 | 33.70 | 41.90 | 423.34 | 0.0008 | 345.64 | 0.0291 |
| 5001BMT.10MS | 6.08 | 17.33 | 26.27 | 34.12 | 974.0 | 0.00147 | 688.1 | 0.03275 |

TABLE 4

Low and High Frequency Data of $Ba_xSr_{1-x}TiO_3$ with varying Weight Percent Barium Magnesium Tantalite and Cerium or/Yttrium

| Composition | Tuning (%) 2 V/um | Tuning (%) 4 V/um | Tuning (%) 6 V/um | Tuning (%) 8 V/um | Dielectric Constant (1 MHz) | Dielectric Loss (1 MHz) | Dielectric Constant (24 GHz) | Dielectric Loss (24 GHz) |
|---|---|---|---|---|---|---|---|---|
| 5001BMTA005Y | 8.12 | 23.49 | 35.65 | 44.52 | 1332.01 | 0.00100 | 895.55 | 0.05420 |
| 5001BMTA010Ce | 9.34 | 20.82 | 29.73 | 36.60 | 903.28 | 0.00120 | 655.37 | 0.03678 |
| 6001BMTA010Ce | 15.51 | 34.89 | 48.65 | 58.15 | 2051.90 | 0.00173 | 1264.74 | 0.10400 |

TABLE 5

Low and High Frequency Data of Ba$x$Sr1−$x$TiO3 with varying Weight Percent Barium Magnesium Tantalite and Glass

| Composition | Tuning (%) 2 V/um | Tuning (%) 4 V/um | Tuning (%) 6 V/um | Tuning (%) 8 V/um | Dielectric Constant (1 MHz) | Dielectric Loss (1 MHz) | Dielectric Constant (24 GHz) | Dielectric Loss (24 GHz) |
|---|---|---|---|---|---|---|---|---|
| 40005BMT.05G | 2.53 | 8.98 | 16.14 | 23.08 | 658.3 | −0.00080 | 495.7 | 0.02105 |
| 50005BMT.05G | 8.76 | 23.24 | 34.78 | 43.66 | 1124.9 | −0.00010 | 857.7 | 0.03595 |
| 50005BMT.10G | 4.67 | 14.46 | 23.72 | 31.47 | 557.6 | −0.00040 | 441.7 | 0.03070 |

TABLE 6

Low and High Frequency Data of BSTO with varying Weight Percent Barium Magnesium Tantalite and others

| Composition | Tuning (%) 2 V/um | Tuning (%) 4 V/um | Tuning (%) 6 V/um | Tuning (%) 8 V/um | Dielectric Constant (1 MHz) | Dielectric Loss (1 MHz) | Dielectric Constant (24 GHz) | Dielectric Loss (24 GHz) |
|---|---|---|---|---|---|---|---|---|
| 5001BMT.10MS05G.A005Ce | 5.26 | 15.26 | 24.82 | 32.92 | 545.6 | 0.00230 | 404.1 | 0.03765 |
| 5001BMT.10MS05G.A010Ce | 4.06 | 13.98 | 23.92 | 31.76 | 616.5 | 0.02280 | 359.9 | 0.03468 |
| 55003BMT.A055CN.A008Ce | 4.97 | 15.07 | 24.08 | 31.28 | 797.95 | 0.00011 | 549.88 | 0.02132 |
| 60003BMT.A055CN.A008Ce | 6.62 | 19.05 | 28.92 | 36.25 | 968.47 | 0.00053 | 670.52 | 0.03230 |

TABLE 7

Tuning and Q (2 GHz) of Screen Printed Co-Planar Thick Film BSTO with Barium Magnesium Tantalite and different kind of glass on MgO crystal substrate

| Material | Glass | Tuning % (0 to 300 V) | Cp-0 V | Q at 0 V (2 GHz) | Q at 300 V (2 GHz) |
|---|---|---|---|---|---|
| 50.005BMT.05G | Ferro CF7574 | 40.0 | 0.910 | 55.0 | 40.0 |
| 50.005BMT.05G | Ferro EG0026 | 40.0 | 0.860 | 51.0 | 39.0 |
| 50.005BMT.05G | VIOX V1483 | 46.5 | 1.188 | 46.5 | 34.0 |
| 50.005BMT.05G | VIOX V1484 | 48.0 | 1.130 | 47.7 | 33.7 |
| 50.005BMT.05G | VIOX V1524 | 46.5 | 0.831 | 32.5 | 30.5 |
| 50.005BMT.05G | VIOX V1558 | 46.7 | 1.253 | 40.0 | 33.0 |

The present materials are particularly unique and ideal for microwave component designs because its tuning characteristics allow for the device to have tailored properties that vary. The variation allows for new concepts in design for filters which may vary the frequency of operation, for antennas to scan and track satellites electronically, and it allows for frequency hopping of microwave devices as well as many other applications. This unique property may be used to build tunable devices for RF, microwave, and mill-wave applications. These tunable devices include varactors (variable capacitors), tunable filters, phase shifters, tunable delay lines, VCO (voltage controlled oscillators), tunable dielectric resonators, tunable impedance-matching devices, and the like.

In accordance with an embodiment of the present invention, the present materials may be incorporated in phased array antennas that are compact, light and relatively inexpensive to make and operate. The tunable dielectric materials may be used as replacements for the more expensive and high power driven ferrites currently used in large scale phased arrays. The present materials are also much more compact, and may be cheaper than materials used in mechanically scanning antennas. The present materials also have the advantage of lower loss without amplification than semiconductor tunable devices at microwave frequencies.

One of the applications of the present materials is to build high performance and low cost dielectric phase shifters. The phase of the dielectric phase shifters may be controlled by changing dielectric constant through biasing the tunable materials. The dielectric phase shifters may be in many configurations such as planar structures (microstrip line, coplanar), and 3-D structures (rectangle waveguide, finline) to meet different application requirements. The dielectric phase shifters have wide operation frequency range, low insertion loss, low consumption power, low intermodulation distortion and low cost, compared to common used ferrite and semiconductor-based phase shifters. Since phase shifters are a key device in a phased array antenna in both performance and cost of the whole antenna, the performance and cost of the antenna may be significantly improved by using the dielectric phase shifters instead of ferrite and semiconductor phase shifters.

Another application field of the present tunable materials is tunable filters. A tunable filter consists of one or more resonators. Each resonator has a inductor-capacitor (LC) resonating circuit. A filter may be tuned by changing inductance and/or capacitance of the resonator. Since the capacitance of the resonator may be easily changed by using the multi-phase tunable materials of the present invention, a low cost, high performance and compact tunable filter is achievable.

The dielectric tunable filters may find many applications in communication systems, although it is understood that the present invention is not limited to communication systems. Most current communication system use fixed filters. However, future communications require wideband communications using frequency-hopping techniques, so that large amounts of digital data can be transferred over the band. A critical component for these applications is a low cost fast-acting tunable filter. Current tunable filters cannot meet the requirements in both performance and cost. Digital data could be distributed or encoded over a band of frequencies in a sequence determined by controlling circuitry of the tunable filter. This would allow for several users to transmit and receive over a common range of frequencies.

The materials of the present invention may provide increased tuning characteristics, very stable structure with applied voltage, good loss characteristics, good temperature stability, and adjustable dielectric constant with desired tuning and loss. The present materials enable many new applications in broadband wireless communications that are currently not possible. In addition, the materials allow for components and antennas to be built at a low cost so that traditionally expensive products can be affordable to individuals, such as phased array antennas and tunable filters.

While the present invention has been described in terms of what are at present believed to be its preferred embodiments, those skilled in the art will recognize that various modifications to the disclose embodiments can be made without departing from the scope of the invention as defined by the following claims.

What is claimed is:

1. An electronically tunable dielectric material, comprising:
   at least one electronically tunable dielectric phase;
   at least one compound of low loss complex perovskites;
   wherein the compound of low loss complex perovskites comprises from about 0.001 to about 50 weight percent of the material; and
   wherein the compound of low loss complex perovskites comprises $A[B1_{1/3}B2_{2/3}]O_3$ materials, where A=Ba, Sr or the combination of Ba and Sr; B1=Mg, Zn or the combination of Mg and Zn; B2=Ta, Nb or the combination of Ta and Nb.

2. The electronically tunable dielectric material of claim 1, wherein the at least one electronically tunable dielectric phase is selected from the group consisting of:
   barium strontium titanate, barium titanate, strontium titanate, barium calcium titanate, barium calcium zirconium titanate, lead titanate, lead zirconium titanate, lead lanthanum zirconium titanate, lead niobate, lead tantalate, potassium strontium niobate, sodium barium niobate/potassium phosphate, potassium niobate, lithium niobate, lithium tantalate, lanthanum tantalate, barium calcium zirconium titanate, sodium nitrate, and combinations thereof.

3. The electronically tunable dielectric material of claim 1, wherein the at least one electronically tunable dielectric phase comprises barium strontium titanate.

4. The electronically tunable dielectric material of claim 3, wherein the barium strontium titanate is of the formula $Ba_xSr_{1-x}TiO_3$, where x is greater than 0 and smaller than 1.

5. The electronically tunable dielectric material of claim 3, wherein the barium strontium titanate is of the formula $Ba_xSr_{1-x}TiO_3$, where x is from about 0.15 to about 0.65.

6. The electronically tunable dielectric material of claim 3, wherein the barium strontium titanate is of the formula $Ba_xSr_{1-x}TiO_3$, where x is from about 0.25 to about 0.60.

7. The electronically tunable dielectric material of claim 1, wherein the compound of low loss complex perovskites comprises from about 0.01 to about 20 weight percent of the material.

8. The electronically tunable dielectric material of claim 1, wherein the compound of low loss complex perovskites comprises from about 0.1 to about 5 weight percent of the material.

9. The electronically tunable dielectric material of claim 1, wherein said material is a composite comprising said electronically tunable material further combined with and at least one other family of materials.

10. The electronically tunable dielectric material of claim 9, wherein said other family of materials is selected from the group consisting of: rare earth oxides, glasses, metal silicates, metal oxides and/or metal titanates.

11. The electronically tunable dielectric composite of claim 10, wherein said rare earth oxides are selected from the group consisting of: oxides of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu) and any combination of the above.

12. The electronically tunable dielectric composite of claim 10, wherein said rare earth oxides are selected from the group consisting of: Sc, Y, La, Ce, Pr, Nd, Sm, Dy, Gd, Ho and/or Er.

13. The electronically tunable dielectric composite of claim 10, wherein said rare earth oxide comprises $CeO_2$.

14. The electronically tunable dielectric composite of claim 10, wherein the percentage of rare earth oxides comprises from about 0.001 to about 5 mole percent of the electronically tunable dielectric phase.

15. The electronically tunable dielectric composite of claim 10, wherein the percentage of rare earth oxides comprises from about 0.01 to about 3 mole percent of the electronically tunable dielectric phase.

16. The electronically tunable dielectric composite of claim 10, wherein the rare earth oxides comprises from about 0.1 to about 2 mole percent of the electronically tunable dielectric phase.

17. The electronically tunable dielectric composite of claim 10, wherein the glasses comprises from boron, barium, calcium, lithium, manganese, silicon, zinc and/or aluminum-containing glasses.

18. The electronically tunable dielectric composite of claim 10, wherein the glasses comprises an amount up to 50 weight percent of the materials.

19. The electronically tunable dielectric composite of claim 10, wherein the glasses comprises from about 0.1 to about 25 weight percent of the materials.

20. The electronically tunable dielectric composite of claim 10, wherein said metal silicates comprises metals from group 2A of the Periodic Table.

21. The electronically tunable dielectric composite of claim 10, wherein the metal silicates are selected from the group consisting of: $Mg_2SiO_4$, $CaSiO_3$, $BaSiO_3$ and $SrSiO_3$.

22. The electronically tunable dielectric composite of claim 10, wherein the metal silicates comprises from about 0.1 to about 80 weight percent.

23. The electronically tunable dielectric composite of claim 10, wherein the metal silicates comprises from about 5 to about 60 weight percent.

24. The electronically tunable dielectric composite of claim 10, wherein the metal silicates comprises from about 0.01 to about 1 weight percent.

* * * * *